(12) United States Patent
Kress et al.

(10) Patent No.: US 7,363,692 B2
(45) Date of Patent: Apr. 29, 2008

(54) TOOL AND METHOD FOR FINE MACHINING WORK PIECES

(75) Inventors: Dieter Kress, Aalen (DE); Friedrich Häberle, Lauchheim (DE)

(73) Assignee: Mapal Fabrik fur Prazisionswerkzeuge, Aalen (DE)

( * ) Notice: Subject to any disclaimer, the term of this patent is extended or adjusted under 35 U.S.C. 154(b) by 0 days.

(21) Appl. No.: 10/571,030

(22) PCT Filed: Sep. 3, 2004

(86) PCT No.: PCT/EP2004/009822

§ 371 (c)(1),
(2), (4) Date: Mar. 8, 2006

(87) PCT Pub. No.: WO2005/025793

PCT Pub. Date: Mar. 24, 2005

(65) Prior Publication Data

US 2007/0028434 A1    Feb. 8, 2007

(30) Foreign Application Priority Data

Sep. 11, 2003    (DE) ................................. 103 41 976

(51) Int. Cl.
*B23P 23/00*    (2006.01)
*B23C 3/00*    (2006.01)

(52) U.S. Cl. ................ 29/558; 29/566; 29/50; 409/132; 409/192; 409/234; 408/1 R; 408/224

(58) Field of Classification Search .............. 29/50, 29/53, 56.5, 566, 557–558; 408/1 R, 239 A, 408/223–224, 225, 239 R; 409/234, 232, 409/132, 192, 203, 213, 217; 82/159, 129, 82/1.11; 407/31, 35; 451/541, 69
See application file for complete search history.

(56) References Cited

U.S. PATENT DOCUMENTS

| 1,343,276 A | * | 6/1920 | Olson et al. ................. 407/26 |
| 1,620,536 A | | 3/1927 | Gairing |
| 1,643,679 A | | 9/1927 | Roderick |

(Continued)

FOREIGN PATENT DOCUMENTS

CH           513 691 A    10/1971

(Continued)

*Primary Examiner*—Erica Cadugan
(74) *Attorney, Agent, or Firm*—Harness, Dickey & Pierce, P.L.C.

(57) ABSTRACT

A tool for fine machining of work pieces involving metal removal is proposed having at least one cutter (13) for preliminary machining with a geometrically defined cutting edge (15) and having at least one cutter (21) for final machining with a geometrically defined cutting edge (23). The characteristic of the tool is that the cutter (13) for preliminary machining is part of a preliminary machining stage (3) and the cutter (23) for final machining is part of a final machining stage (5) and that an interface (9) located between the preliminary machining stage (3) and the final machining stage (5) is provided with a first flat surface (27) and a second flat surface (29) which are located on the preliminary machining stage (3) and the final machining stage (5) and which has a device (11) ensuring the coaxiality of the preliminary machining stage (3) and the final machining stage (5) to each other.

6 Claims, 2 Drawing Sheets

U.S. PATENT DOCUMENTS

| | | |
|---|---|---|
| 2,842,015 A | 7/1958 | Miller |
| 4,242,020 A * | 12/1980 | Schmid ............... 409/234 |
| 4,990,036 A * | 2/1991 | Eklund et al. ............ 407/113 |
| 5,542,792 A * | 8/1996 | Krueger et al. ............ 407/35 |
| 5,551,811 A * | 9/1996 | Satran et al. ............... 407/40 |
| 5,653,152 A * | 8/1997 | Oles et al. ................ 82/1.11 |
| 5,800,098 A * | 9/1998 | Satran et al. ............... 407/31 |
| 6,343,902 B1 * | 2/2002 | Nishikawa ............... 409/132 |
| 6,532,849 B1 * | 3/2003 | Yamazaki et al. .......... 82/158 |
| 6,808,342 B2 | 10/2004 | Kress et al. |
| 6,902,355 B2 | 6/2005 | Kress et al. |
| 6,905,278 B2 * | 6/2005 | Kress et al. ............. 403/296 |
| 6,984,094 B2 * | 1/2006 | Nuzzi et al. ............. 408/224 |
| 7,097,400 B2 * | 8/2006 | Kress et al. ............. 409/231 |
| 2001/0041106 A1 * | 11/2001 | Nagaya et al. ............. 407/101 |
| 2002/0067965 A1 | 6/2002 | Kress et al. |
| 2003/0012616 A1 | 1/2003 | Kress et al. |
| 2005/0002746 A1 | 1/2005 | Kress et al. |

FOREIGN PATENT DOCUMENTS

| | | |
|---|---|---|
| DE | 613241 | 5/1935 |
| DE | 36 02 427 A | 7/1987 |
| DE | 100 48 910 A1 | 5/2002 |
| DE | 101 28816 A1 | 1/2003 |
| DE | 101 37 000 A1 | 2/2003 |
| GB | 1 368 270 A | 9/1974 |

\* cited by examiner

TOOL AND METHOD FOR FINE MACHINING WORK PIECES

The invention relates to a tool for fine machining work pieces and a method for fine machining work pieces.

Tools and methods of the type addressed here are well known. The tools are characterized by what is known as a stepped cutter which comprises a geometrically defined cutting edge. For fine machining work pieces, the tool and/or the work piece is set in rotation and an axial shift is performed in the direction of the axis of rotation so that the cutter removes shavings from a surface of the work piece being machined. Usually the work piece is clamped, the tool is set in rotation and undergoes an advancing motion. The cutter thereby removes shavings from a surface of the work piece.

The initial stage of the stepped blade—viewed in the direction it advances—is intended for preliminary machining, the rear stage for the smoothing or final machining of the surface of the work piece. Progressive cutters are expensive and difficult to manufacture, and re-sharpening this type of cutter is difficult. Secondly, the design of the cutters for the preliminary and final machining is practically the same, at least they consist of the same material. This is disadvantageous in view of the different requirements for preliminary and final machining and consequently for the cutters: the cutter for the preliminary machining must be particularly heat resistant, the cutter for the final machining must have very strong edges.

The requirements for the manufacturing accuracy of holes in work pieces are becoming more and more demanding. The dimensional accuracy of the hole is particularly important, its diameter, roundness and cylindricality, and surface quality is also of critical importance.

It is essential that accuracy and surface quality are maintained when machining a large number of work pieces, even with materials that are difficult to machine, such as specific types of castings and steel for example. It has been shown that the improvement in accuracy and extension of tool life are related to the depth of cut during final machining: the shallower the depth of cut, the better the surface quality, dimensional accuracy and tool life that are achieved.

With reference to the requirements being addressed here, the best results are achieved at cut depths which lie in a range of a few 1/100 mm. In order to achieve consistent allowances of such a small size, the concentricity between preliminary and final machining has to be extremely precise. This involves great expense in the area of preliminary machining.

The use of the progressive cutters described above has not been successful due to the expense and difficulty of manufacture and particularly in view of the problems with re-sharpening.

Methods for fine machining work pieces are known in which two different tools are used; one of them is used for preliminary machining and one for final machining of the work piece. When machining a work piece, a tool change must be made after the preliminary machining in order to perform the final machining. It is also conceivable to bring the work piece on a transfer line first to a preliminary machining and then to a final machining tool. The problem is that the axes of rotation of the tools do not run exactly coaxial, so that it is not possible to achieve sufficient manufacturing accuracy and optimal surface quality.

The end result is that the tool and the method do not ensure sufficient accuracy in manufacture and that tool life is inadequate.

The object of the invention is therefore to create a tool and a method for fine machining work pieces which eliminate the disadvantages mentioned.

According to one particular feature, the present disclosure provides a cutter for preliminary machining and a cutter for final machining which are separated from each other by an interface. By separating the two cutters, it is possible to use cutters which are specially modified for machining, preliminary machining and final machining, which produces a clear improvement in manufacturing accuracy. Since the interface has a preliminary machining stage with a first flat surface and a finish machining stage with a second flat surface, and in addition a device which acts to provide the greatest possible co-axial alignment of the preliminary machining stage with the final machining stage and with the aid of which the two stages can be connected extremely precisely, very small cut depths of a few 1/100 mm can be achieved and thereby optimal manufacturing accuracy with long tool life.

According to another particular feature, the present disclosure provides a method in which preliminary and final machining is performed by at least two cutters, separated from each other by an interface, which successively engage the surface of the work piece to be machined in one machining step. So it is possible to submit the same surface of a work piece to a preliminary machining step and a final machining step with a single tool.

One embodiment of the method is particularly preferred whose characteristic feature is that cuttings of a few 1/100 mm can be removed in final machining. This results in optimal manufacturing accuracy, in precise dimensional accuracy and in very high surface quality, along with long tool life.

The invention is explained in more detail in what follows with reference to the drawings.

Figure 1:
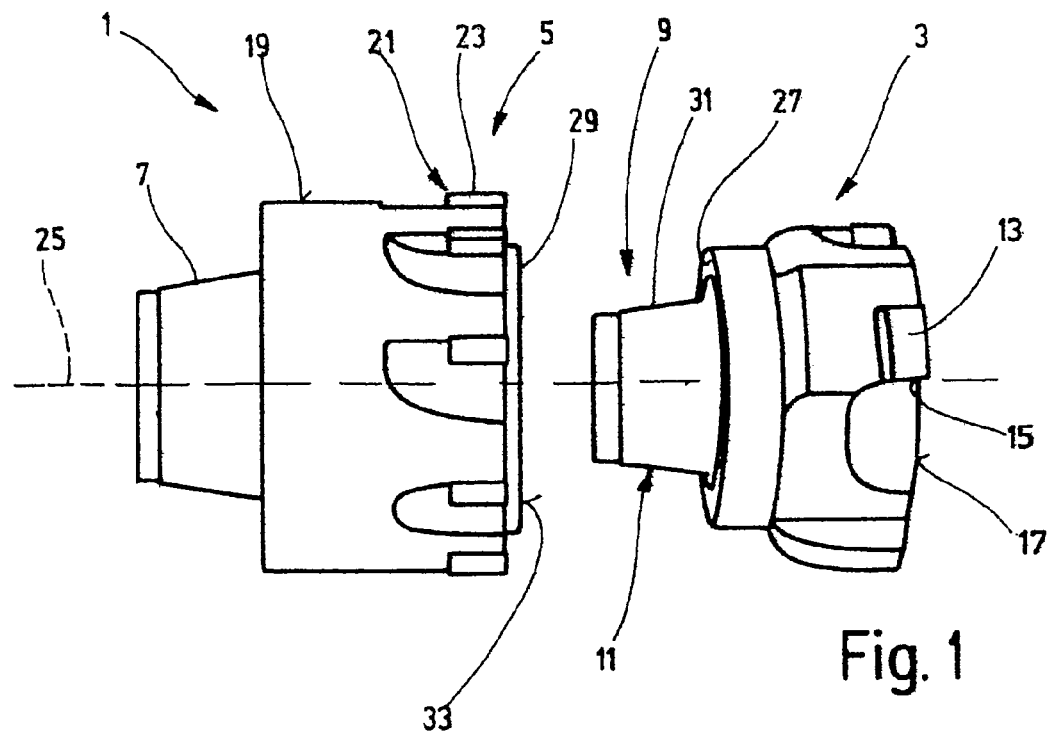
FIG. 1 shows a side elevation of a first embodiment of a tool in an exploded view.

FIG. 1 shows a first embodiment of a tool 1 which is used to remove metal in the fine machining of work pieces and has a preliminary machining stage 3 and a final machining stage 5.

The tool 1 can be connected in a suitable way to a machine tool—directly or by means of an interim piece, an adapter or similar—for example, by means of a tapered shaft 7 which engages a tool holder and is clamped to it in a suitable way.

The preliminary machining stage 3 and the final machining stage 5 are rigidly connected by an interface 9 which has a device 11 with the aid of which the relative position of the two stages can be adjusted. Its purpose is to locate the stages 3 and 5 as coaxially as possible. The function of the interface 9 is therefore to connect the two stages 3 and 5 of the tool 1 in such a manner that the center axes of the two stages 3 and 5 coincide with each other and with the center axis 25 of the tool 1. With the help of such precise interfaces it is possible to limit errors in concentricity to 3 µm maximum.

The preliminary machining stage 3 has at least one, here by way of example, three cutters 13 with a geometrically defined cutting edge 15. The cutter 13 is configured here by way of example as a tangential cutter which is inserted into the face 17 of the preliminary machining stage 3 and secured there in a suitable manner.

In the same way, the final machining stage 5 has a least one, here several, cutters 21 with a geometrically defined cutting edge 23 inset at the same distance in the circumferential surface 19 of the final machining stage 5. The cutting edges 15 of the cutters 13 of the preliminary machining stage 3 and the cutting edges 23 of the cutters 21 of the final machining stage 5 lie on circles running concentrically to the center axis 25 of the tool 1, where the diameter for the preliminary machining is smaller than the final machining diameter. The differences in the diameters are shown enlarged in FIG. 1 for the sake of clarification.

The interface 9 has a first flat surface 27 in the area of the preliminary machining stage 3, final machining stage 5 has a second flat surface 29. The flat surfaces are configured here by way of example as circular surfaces which solidly abut each other when the interface 9 is in its assembled state. The flat surfaces 27 and 29 lie on planes to which the center axis 25 of the tool 1 stands perpendicular. Their particular function is to locate stages 3 and 5 to each other such that the center axis of the preliminary machining stage 3 does not show any angular offset compared to the center axis of the finish-machining stage 5, in other words it is not tilted compared to it.

In the embodiment shown in FIG. 1, the interface 9 is equipped with a device 11 which, on one of the stages, here the preliminary machining stage 3, has a taper, preferable a small-sized full taper 31 which engages a conical seat which is formed into the face 33 of the finish-machining stage 5.

Figure 2:
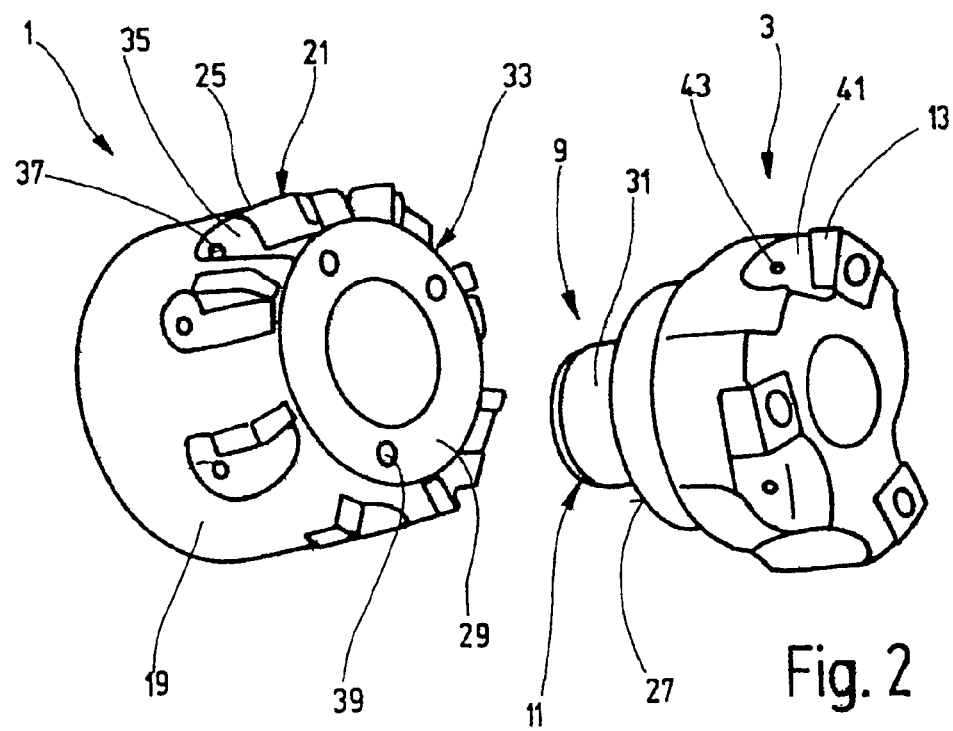
FIG. 2 shows a perspective view of a tool.

FIG. 2 shows the tool 1 from FIG. 1 in a perspective view. Identical parts are given the same reference numbers so that reference is made to the description for FIG. 1.

The at least one cutter 21 is clearly discernible here. In the embodiment shown here eight cutters are inserted at the same circumferential distance in the peripheral surface 19 of the final machining stage 5. When machining a work piece the final machining stage 5 rotates clockwise—viewed in the direction of advancement—so that the cutting edges 25 of the cutters 21 remove chips from the work piece surface. Viewed in the direction of rotation, a space 35 is provided ahead of each cutter for swarf where the chips which have been removed end up.

Preferably the tool 1 is connected to a source of coolant/lubricant in order to be able to cool the cutters 21 when machining a work piece and to remove the resulting chips. In the illustration shown in FIG. 2 it can be seen that a coolant/lubricant passage 37 opens into a machining space 35 to achieve the desired effect.

Coolant/lubricant passages similarly open into the face 33 or into the second flat surface 29 through which the coolant/lubricant is brought into the preliminary machining stage 3. FIG. 2 shows that coolant/lubricant passages 43 similarly open into a space 41 for chips located in front of each cutter 13. This makes it possible to cool the cutters 13 of the preliminary machining stage 3 and to remove the swarf.

The conical recess 45 can still be seen in FIG. 2 which is introduced into the face 33 of the final machining stage 5 and which serves to seat the full taper 31. This latter is anchored in the customary way in the interior of the recess 45. Standard clamping means can be used. It is crucial that the preliminary machining stage 3 can be positioned exactly by means of the interface 9 relative to the final machining stage 5, wherein the angular position of the two stages is ensured with the aid of the flat surfaces 27, 29 and their co-axiality is ensured by means of the device 11.

In light of the explanations it is clear that the device 11 can also be configured as its mirror image: in the case of the tool 1 from FIG. 1 the full taper 31, which emanates from the preliminary machining stage 3, could also be located on the final machining stage 5 and engage a matching recess in the preliminary machining stage 3.

Figure 3:
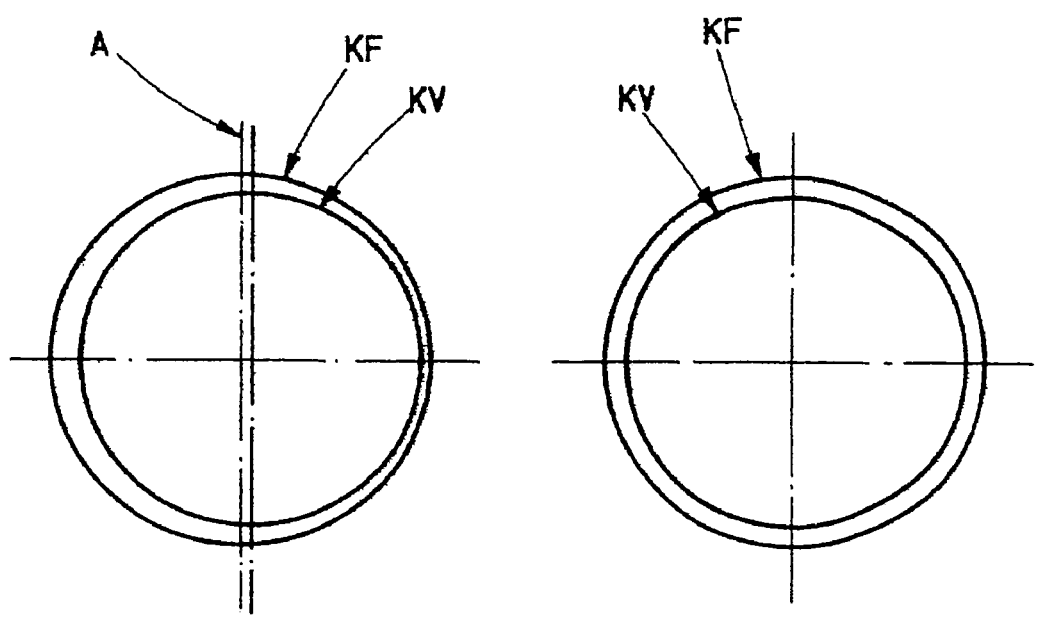
FIG. 3 shows a sketch to clarify the co-axiality of the two stages of a tool.

FIG. 3 shows a schematic comparison of the circles on which the at least one cutter 13 of a preliminary machining stage 3 and the at least one cutter 23 of a finish-machining stage 5 are located.

On the right in FIG. 3 one can see a circle KV on which the cutting edge 15 of the at least one cutter 13 of the preliminary machining stage 3 is located and a circle KF on which the cutting edge 23 of the at least one cutter 23 of final machining stage 5 is located. The two circles are practically concentric to each other in the case of tool 1 because the preliminary machining stage 3 is clamped very precisely to the final machining stage 5 by means of the interface 9.

To the left of the concentric circles KV and KF a sketch indicates that in the case of traditional tools in which the preliminary and final machining take place separately, the circles KF and KV are not located concentrically to each other because it is practically impossible to align the tools for the preliminary and final finishing concentrically to each other. Usually there is an axial offset A, by which the circle KV is offset to the circle KF, shown here on the right by way of example.

In the two sketches from FIG. 3 the distance between the two circles KV and KF indicates which area of a hole has to be removed in the final machining of a work piece. In practice, the aim is to achieve a very shallow cut depth in fine machining, in the area of a few 1/100 mm. This means that in the circles KV and KF reproduced in FIG. 3, a very small difference is size is being represented. If, as shown in the sketch on the left in FIG. 3, an axial offset A results, the inner circle KV can touch the outer circle KF so that in the area of contact during fine machining no more chips are removed. This results in inadequate surface quality. In addition, the position of the finally machined hole deviates from the desired position by the axial offset A.

Since the preliminary machining stage 3 and the final machining stage 5 in the case of the tool 1 in accordance with FIGS. 1 and 2 are clamped precisely concentric to each other by means of the interface 9, the result is always the picture shown on the right in FIG. 3: the circles KV and KF lie practically concentric to one another so that a very small cut depth can be realized in finish machining.

The result of this is extremely good manufacturing accuracy, meaning dimensional accuracy and surface quality, but also long tool life for the tool.

It is critical that two stages are provided in the case of the tool 1, which is to say a preliminary machining stage 3 which comprises at least one cutter 13 with a cutting edge 15, and a final stage 5, which has at least one cutter 21 with a cutting edge 23. It is extremely advantageous for preliminary machining and final machining if the cutters can be specially tailored to the specific machining operation. By separating the two stages 3 and 5 in the area of the interface 9, it is easily possible to provide a heat-resistant cutter for preliminary machining and a cutter with high edge strength for final machining.

The preliminary machining stage 3, as FIG. 1 shows, can be provided with at least one cutter 13 which is inserted tangentially into the face 17 of the preliminary machining stage 3.

The final machining stage 5 is preferably executed as a steel body into whose peripheral surface 19 the at least one cutter 21 is brazed. Cutters of hardened metal, cermet, polycristal diamond and polycristal boron can be used.

Since the two stages 3 and 5 are produced in separate manufacturing processes and are also ground separately, the optimal cutter geometry can be produced for each of the stages without the need to consider irregular contours when grinding as is necessary with single-piece tools or progressive cutters.

In the case of the tool 1, cutters 13 and 21 can be utilized for the preliminary machining stage 3 and the final machining stage 5, which lie on concentric circles KV and KF, which can also be described as cutting circles because of the highly precise interface 9. As part of the preliminary machining, it is possible to pre-machine a hole in a work piece with a diameter by means of the preliminary machining stage 3 which is very close to the diameter of the final machined hole. This makes it possible to provide cut depths in final machining in the range of a few 1/100 mm and to ensure that a practically equal cut depth is achieved in the entire range of final machining.

It is characteristic of the tool 1 that two stages 3 and 5 with at least one cutter 13 or 21 each are realized which machine one and the same area of a work piece. The preliminary machining stage 3 machines one area of the work piece, which is machined in one and the same machining step by means of the cutter 21 of the final machining stage 5. The tool 1 therefore has two machining stages 3 and 5 which are separated by means of an interface 9 and can consequently be manufactured separately from one another, but serve to machine the same area on the work piece.

With the aid of the tool 1 described here, one procedure for final machining work pieces can be realized, in which the preliminary machining and final machining is performed by at least two cutters separated from each other by an interface, that is to say by means of the at least one cutter 13 in the preliminary machining stage and by means of the at least one cutter 21 in the final machining stage 5. The cutters 13 and 21 in the two stages 3 and 5 successively engage the same surface of the work piece to be machined in one machining step. In other words: one area of the work piece is machined in one machining step by the cutters of two stages 3 and 5 of a tool 1.

One embodiment of the method is particularly preferred in which a cut depth of a few 1/100 mm, specifically 0.02 to 0.1 mm, preferably from 0.04 to 0,06 mm, in particular of 0.05 mm is realized. Manufacturing accuracy is improved as a result of this very low cut depth, meaning the dimensional accuracy and surface quality of the work piece. Simultaneously, very long tool life is ensured.

As a result of the special construction of the tool 1, extremely precise concentricity between the preliminary and final machining is realized, and moreover a very consistent machining allowance.

The following is clear from the explanations concerning the tool 1:

It is possible to position an interface 9 between a preliminary machining stage 3 and a final machining stage 5, which offers the advantage of investigating the particular desired machining requirements during manufacture, for example the heat resistance of the at least one cutter of the preliminary machining stage and the edge strength of the at least one cutter of the final machining stage in the manufacture of the machining stages.

As a result of the extremely precise connection between the two stages 3 and 5 using the interface 9, the additional possibility is created, as part of final machining, of realizing extremely small cut depths. To do this it is necessary for the two parts of the tool, the preliminary machining stage 3 and the final machining stage 5 to be aligned very precisely with respect to each other, firstly with regard to the angle of the center axes of the two stages and secondly with regard to the concentricity of the center axes of the preliminary machining stage 3 and the final machining stage 5. Here it is possible to align the two stages concentrically to each other within less than µm.

The interface 9 described here makes it possible to connect the two machining stages 3 and 5 such that the tool 1 possesses great rigidity. Furthermore, as a result of separating the two machining stages, vibrations are reduced which could diminish the surface quality of the machined work piece and reduce the life of the tool 1.

What is claimed is:

1. A method for the final machining of a hole in a workpiece involving metal removal comprising:
    providing a tool for the final machining of workpieces involving metal removal comprising:
        a preliminary machining stage including at least one cutter for preliminary machining with a geometrically defined cutting edge;
        a final machining stage including at least one cutter for final machining with a geometrically defined cutting edge;
        an interface located between the preliminary machining stage and the final machining stage provided with a first flat surface and a second flat surface which are located on the preliminary machining stage and the final machining stage, respectively; and
        a device ensuring the coaxiality of the preliminary machining stage and the final machining stage to each other for the coaxial alignment of the stages, the device having a tapered recess and a tapered shaft which engages the tapered recess;
    wherein the preliminary and final machining are performed by the preliminary and final machining stages, respectively, which engage the surface of the workpiece to be machined successively in one operating step.

2. The method for the final machining of a hole in a workpiece according to claim 1, wherein in the final machining a cut depth of no greater than 0.1 mm is selected.

3. The method for the final machining of a hole in a workpiece according to claim 1, wherein in the final machining a cut depth of between 0.02 to 0.1 mm is selected.

4. The method for the final machining of a hole in a workpiece according to claim 1, wherein in the final machining a cut depth of between 0.04 to 0.06 mm is selected.

5. The method for the final machining of a hole in a workpiece according to claim 1, wherein the tapered shaft is tapered substantially along its entire length.

6. The method for the final machining of a hole in a workpiece according to claim 1, wherein the geometrically defined cutting edge of the at least one cutter for the preliminary machining is arranged on a first circle and the geometrically defined cutting edge of the at least one cutter for the final machining is arranged on a second circle, the difference between the radii of the first and second circles being no more than approximately 0.1 mm.

* * * * *